(No Model.)

3 Sheets—Sheet 1.

J. W. BONTA.
LINK WELDING MACHINE.

No. 483,418.  Patented Sept. 27, 1892.

Witnesses:
Fred D. Goodwin
Frank Bechtold

Inventor:
James W. Bonta
By his Attorneys
Howson & Howson (No Model.) 3 Sheets—Sheet 2.
J. W. BONTA.
LINK WELDING MACHINE.
No. 483,418. Patented Sept. 27, 1892.
FIG. 2.
FIG. 4.
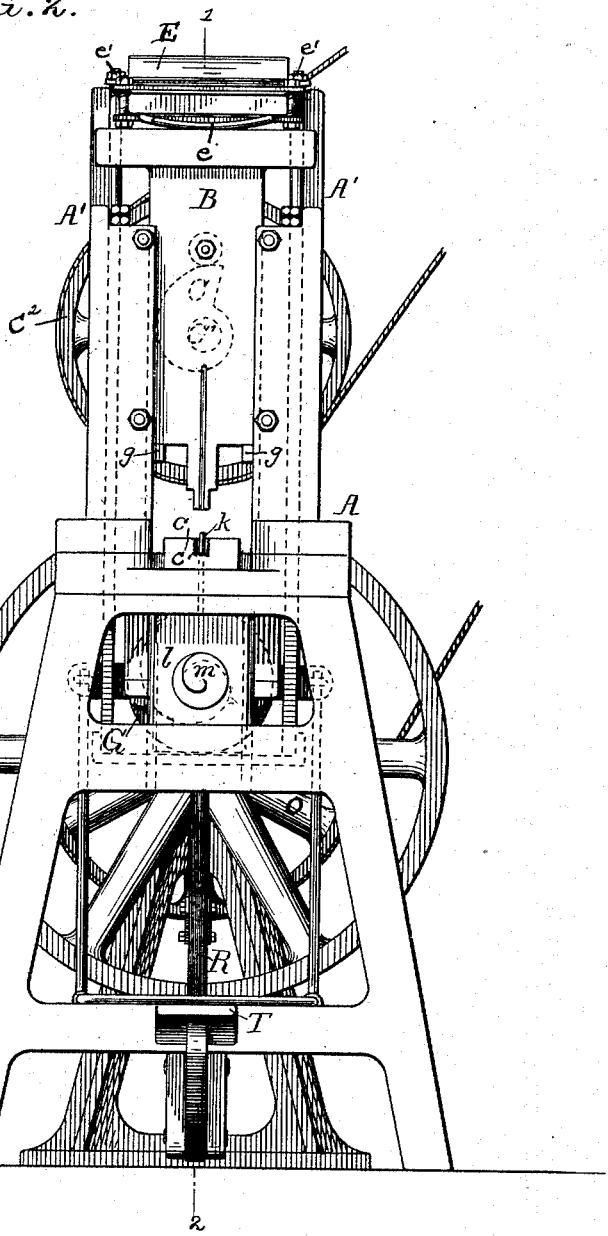
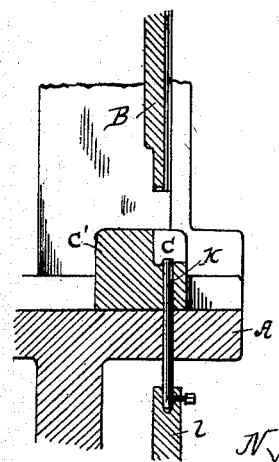
Witnesses:
Fred D. Goodwin
Frank Bechtold
Inventor:
James W. Bonta
By his Attorneys
Howson & Howson (No Model.) 3 Sheets—Sheet 3.

J. W. BONTA.
LINK WELDING MACHINE.

No. 483,418. Patented Sept. 27, 1892.

Witnesses:
Fred D. Goodwin
Frank Bechtold

Inventor:
James W. Bonta
By his Attorneys
Howson & Howson

UNITED STATES PATENT OFFICE.

JAMES W. BONTA, OF WAYNE, PENNSYLVANIA.

LINK-WELDING MACHINE.

SPECIFICATION forming part of Letters Patent No. 483,418, dated September 27, 1892.

Application filed February 23, 1892. Serial No. 422,556. (No model.)

*To all whom it may concern:*

Be it known that I, JAMES W. BONTA, a citizen of the United States, and a resident of Wayne, Delaware county, Pennsylvania, have invented certain Improvements in Link-Welding Machines, of which the following is a specification.

The object of my invention is to provide a machine for welding chain-links which have been previously bent into proper shape, and this object I attain in the manner hereinafter set forth, reference being had to the accompanying drawings, in which—

Figure 1:
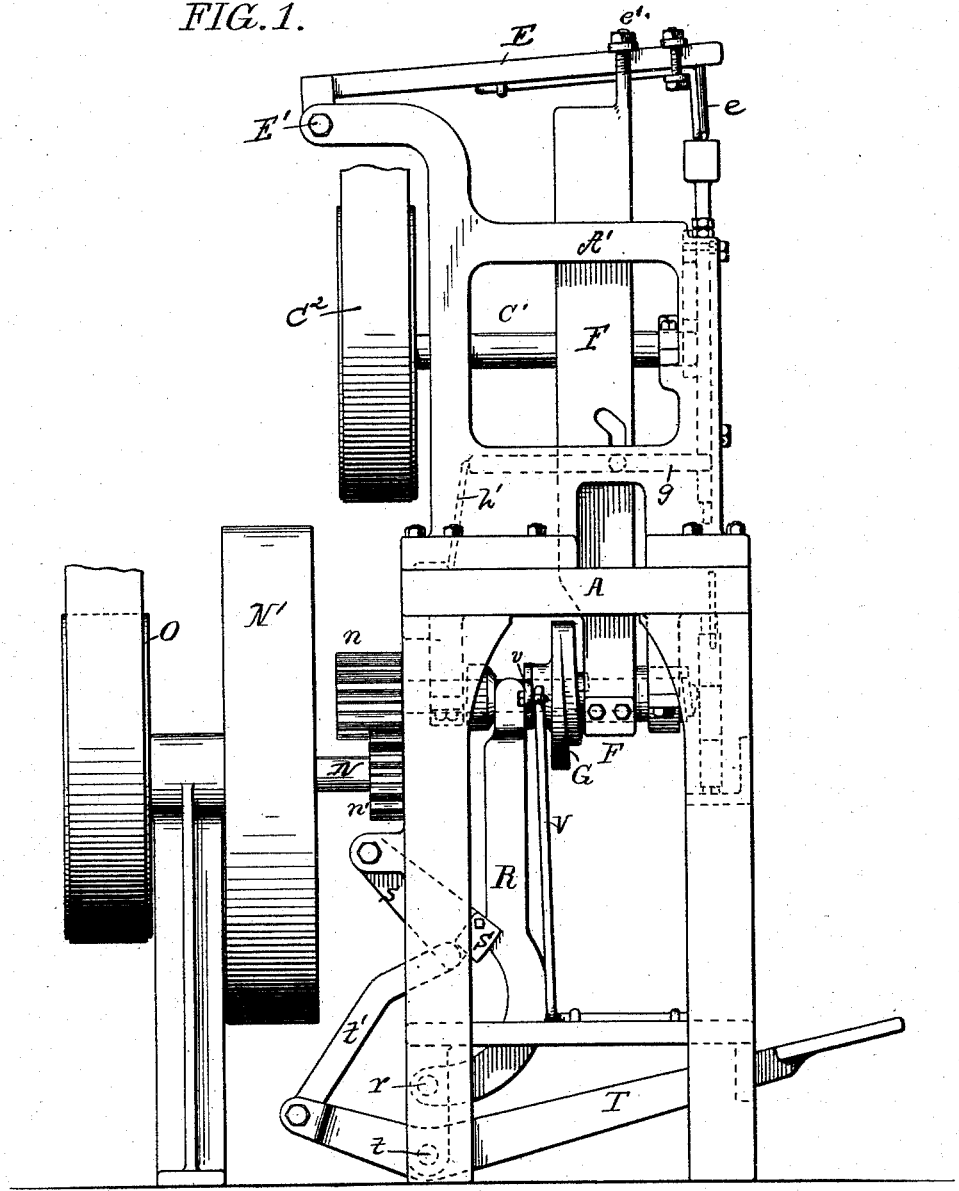
Figure 3:
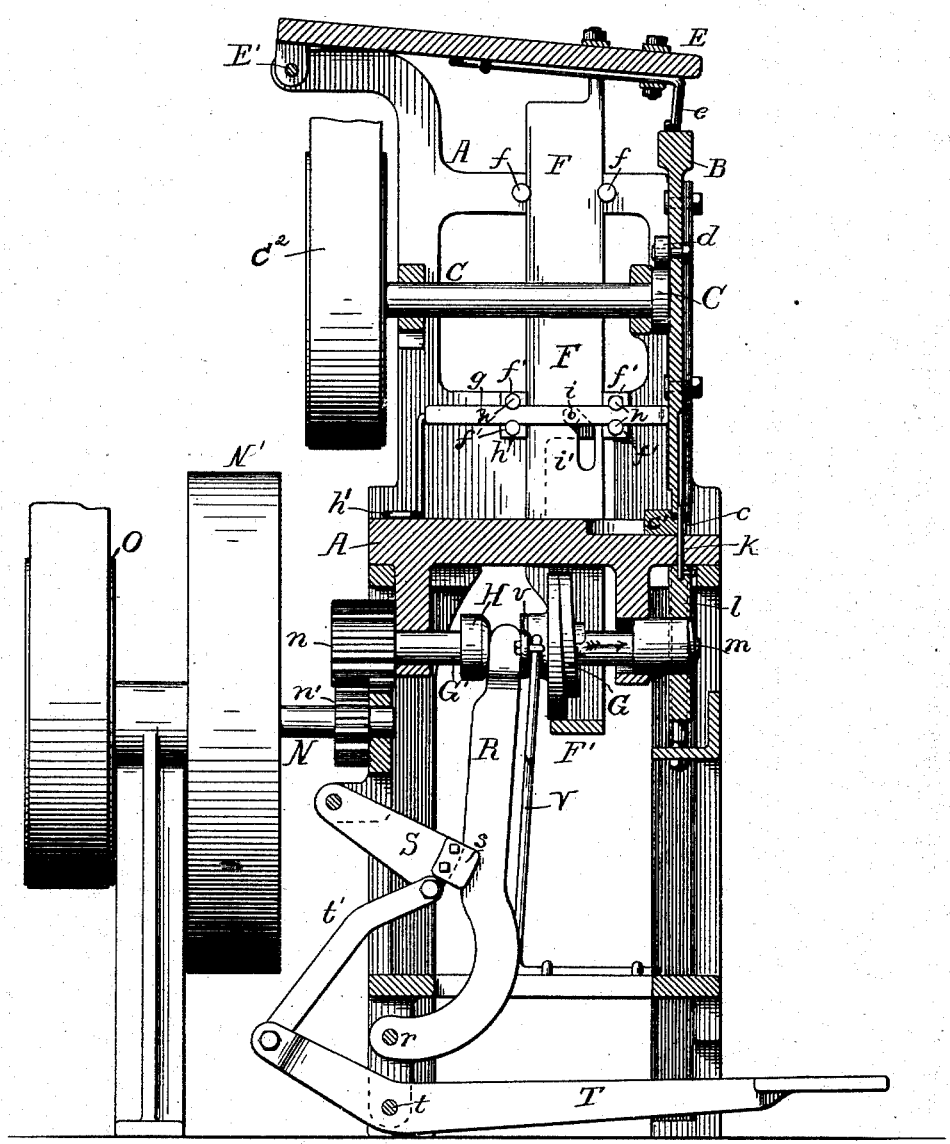

Figure 1 is a side elevation of the machine constructed in accordance with my invention, the parts being shown out of operative position. Fig. 2 is a face view of the same with the parts in operative position. Fig. 3 is a transverse sectional view on the line 1 2, Fig. 2, and Fig. 4 is an enlarged sectional view illustrating the construction of the dies.

The framework comprises a bed A, supported upon suitable standards and provided with suitable bearings for the operating-shafts, and from the bed A extend side frames A', supporting and guiding the hammer B and its operating mechanism. The lower end of the hammer is of suitable shape to fit the die $c$, in which the link to be welded is placed, and a suitable reciprocating motion is imparted to it through the medium of a rotating cam C, mounted upon a cam-shaft C' and operating upon an antifriction-roller $d$, mounted upon a stud secured to the rear of the hammer, the cam acting to lift the hammer against springs $e$, secured to a frame E, and the descending surface of the cam being abrupt, so that after the lifting-face of the cam has passed under the antifriction-roller the springs $e$ will act to force the hammer down upon the die and strike a blow upon the link, the force of the blow being regulated by increasing or diminishing the pressure on the springs by adjusting the nuts $e'$ on bolts carried by side bars F and extending through the frame E. The frame E is hinged to the side frames A' at E' and when in operative position is drawn down, as shown in Fig. 3, by means of opposite side bars F, secured at their upper ends to the frame E and at their lower ends being united by a cross-bar F', which is acted upon by a screw-cam G, mounted upon the longitudinally-movable main shaft G', that portion of the periphery of the cam G which is kept in continuous contact with the cross-bar F' being a perfect circle, so that no motion is imparted to the side bars, except in starting and stopping the machine.

The side bars F are suitably guided by antifriction-rollers $f$ and guides $f'$, and mounted on the opposite sides of the framework of the machine are locking-bars $g$, guided between antifriction-rollers $h$ and under the action of a spring $h'$, the tendency of which is to push the bars forward under the hammer B, but such movement being prevented by a pin or antifriction-roller $i$, carried by said bars and held within a cam-slot $i'$ in the side bars.

When the machine is out of action and the cam G is not in contact with the cross-bar F', the side bars F will be raised by the action of the springs $e$ against the top of the hammer, and the locking-bars $g$ will then be pushed forward by the cam-slots $i'$ under the hammer and will hold said hammer in its highest position, as shown in Fig. 1.

The die $c$ is cut upon the anvil-block $c'$, and the anvil-block is provided with an orifice for the reception of a vertical pin $k$, carried by a block $l$, which is held in vertical guides under the bed A and is adapted to be acted upon by a screw-cam $m$, mounted upon the shaft G', and which when the machine is started enters a circular opening in said block $l$ a sufficient distance to permit its circular body portion to freely rotate without further effecting the movement of the block, which it holds in its highest position, and keeps the pin $k$ in such position that the link being welded may be placed over said pin and held in proper position under the action of the hammer.

The shaft G' is mounted in suitable bearings depending from the bed-plate A and is provided with the aforesaid screw-cams G and $m$ and the gear-wheel $n$, which meshes with a gear-wheel $n'$, mounted upon the main shaft N, which carries a fly-wheel N', and to which the necessary driving motion is imparted by the belt-wheel O.

The shaft G' is provided with a grooved collar H, permanently secured to the shaft, and embracing this collar is a forked lever R, the lower end of which is fulcrumed at $r$ to the frame, and acting upon the rear face of this lever R is a second lever S, which is provided with projecting side blocks s, embracing the lever R, and the necessary power to operate the lever R through the medium of the lever S is imparted through a pedal-lever T, fulcrumed at t to the frame and connected to the lever S by a bar t'. The shaft is normally held in the position shown in Fig. 1 by a spring V, carried by the frame and secured to projections y on the collar H.

In operation the depression of the lever causes the movement of the shaft G' and its cams in the direction of the arrow toward the front of the machine, the screw-cam G engaging with the cross-bar F' and the screw-cam m engaging with the orifice in the block l, and as the pressure is continued the gradual turning of the screw-cams will draw down the cross-bar F' and force up the block l until the smooth circular portions of said screw-cams are in engagement with their respective parts, and such parts are held in operative position until the treadle is released, when the spring V returns the parts to the position shown in Fig. 1. The pin k in its highest position projects into the path of the hammer, which has a grooved face for its reception, and the links are placed one by one over said pin and in the die c, and the rotation of the cam-shaft C' through its belt-wheel C² causes the raising of the hammer against the action of the spring e, and when released the spring forces the hammer down upon the die with sufficient force to effect the welding of the link.

Having thus described my invention, I claim and desire to secure by Letters Patent—

1. The combination of the reciprocated hammer, an anvil, a frame E above said hammer and pivoted to the side frames of the machine, springs between said frame and the edge of the hammer, a holding-pin adapted to pass through the anvil and engage with the inner surface of the link, a rotated power-shaft, and screw-cams thereon adapted to act simultaneously to depress the frame E' and raise the holding-pin, substantially as specified.

2. The combination of the hammer, an anvil, frame E, pivoted to the main frame of the machine, springs between said frame E and the hammer, a cam for raising said hammer against the action of the spring, side bars F, extending from said frame E, a cross-bar F', and a screw-cam adapted to act upon said cross-bar F', substantially as specified.

3. The combination of the hammer, the anvil, a cam for raising said hammer, a frame E, springs e between the frame E and the hammer, the side bars F, and hammer-locking bars guided in the frame of the machine and adapted to pass under a shoulder on the hammer, and a pin carried by said locking-bars engaging with a cam-slot in said side bars F, substantially as specified.

4. The combination of the reciprocated hammer, an anvil, a pin k, projecting through said anvil, a block l, carrying said pin, a frame E, springs between the hammer and the frame E, side bars F, a cross-bar F', uniting said side bars F, a longitudinally-movable shaft G', and screw-cams on said shaft G', adapted to engage, respectively, with the cross-bar F' and the recess in the block l, substantially as specified.

5. The combination of the frame E, the side bars F, cross-bar F', the hammer, springs between said hammer and the frame E, a screw-cam G, a longitudinally-movable shaft G', carrying the said cam G, a sleeve H on said shaft, a lever R, engaging with said sleeve, and means for operating said lever R to effect the longitudinal movement of said shaft, substantially as specified.

In testimony whereof I have signed my name to this specification in the presence of two subscribing witnesses.

JAMES W. BONTA.

Witnesses:
JNO. E. PARKER,
H. F. REARDON.